(12) United States Patent
Smith et al.

(10) Patent No.: US 6,325,391 B1
(45) Date of Patent: Dec. 4, 2001

(54) PTFE WINDOW SEAL WITH EMI SHIELDING

(75) Inventors: Dennis J. Smith, Minneapolis; Randall C. Olson, Prior Lake; Steven D. Kruse, Bloomington, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/301,419

(22) Filed: Apr. 28, 1999

Related U.S. Application Data
(60) Provisional application No. 60/108,050, filed on Nov. 12, 1998.

(51) Int. Cl.$^7$ .................................................. F16J 15/08
(52) U.S. Cl. ......................... 277/650; 277/312; 277/630; 277/920
(58) Field of Search .................... 277/650, 616, 277/617, 627, 630, 637, 641, 644, 920, 312, 317; 73/290 R

(56) References Cited

U.S. PATENT DOCUMENTS

| | | |
|---|---|---|
| 3,019,281 * | 1/1962 | Hartwell . |
| 4,566,321 | 1/1986 | Zacchio . |
| 4,932,673 * | 6/1990 | Domnikov et al. . |
| 5,061,467 | 10/1991 | Johnson et al. . |
| 5,115,104 * | 5/1992 | Bunyan . |
| 5,115,218 | 5/1992 | Jean . |
| 5,117,066 * | 5/1992 | Balsells . |
| 5,200,722 | 4/1993 | Wolf . |
| 5,305,237 | 4/1994 | Dalrymple et al. . |
| 5,495,218 | 2/1996 | Erb et al. . |
| 5,507,181 * | 4/1996 | Fox et al. . |
| 5,508,712 | 4/1996 | Tom et al. . |
| 5,594,449 | 1/1997 | Otto . |
| 5,703,289 | 12/1997 | Mulrooney . |
| 5,770,990 | 6/1998 | Lubbers . |
| 6,155,112 | 12/2000 | Eckert et al. .......................... 73/290 |

FOREIGN PATENT DOCUMENTS 0 992 942 A1   6/1999   (EP) .

OTHER PUBLICATIONS

Published Advertisement *MeasureTech™RCM Features and Benefits*, date not available (undated).

* cited by examiner

*Primary Examiner*—Michael F. Trettel
*Assistant Examiner*—James M Hewitt
(74) *Attorney, Agent, or Firm*—Westman, Champlin & Kelly, PA

(57) ABSTRACT

A process seal made of a material such as polytetrafluoroethylene is used as a microwave window in a radar tank level gauge. The periphery of the process seal is surrounded by a metal containment ring that is fitted to the periphery to limit the amount of expansion outwardly of the process seal material as well as provide for localized loading at the periphery for clamping pressures on the seal. Electromagnetic radiation shielding is provided not only by the containment ring, but also by an EMI shielding O-ring mounted in a groove on a sealing end of the containment ring. A process environmental O-ring is carried by the process seal in an outer shoulder groove that is enclosed by the containment ring.

25 Claims, 4 Drawing Sheets

PTFE WINDOW SEAL WITH EMI SHIELDING

CROSS-REFERENCE TO CO-PENDING APPLICATIONS

This application claims the priority of earlier filed co-pending Provisional patent application No. 60/108,050 filed Nov. 12, 1998 and entitled PTFE WINDOW SEAL WITH EMI SHIELDING.

BACKGROUND OF THE INVENTION

The present invention relates to a process window seal that will transmit microwave energy and includes a surrounding ring with seals to reduce or prevent microwave energy leakage. The ring contains the window seal to avoid creep or cold flow across a wide range of temperatures to avoid failures under operating pressures.

In the past, there have been considerable developments in the use of microwave (radar) gauges for determining tank levels. These gauges depend upon transmitting microwave energy toward a surface of material inside a tank or container, and then receiving an echo or return signal to determine the level of the material sending the echo. The correct type of device depends in part on the overall distance that needs to be measured, that is the height of the material in the tank between its lowest level and its highest level. Also, the surface conditions of the materials are of importance in measuring tank level, as are the dielectric constant or conductivity of the material to be measured.

In using a radar gauge, the process tank or container that is to be monitored can sometimes be at a very high temperature, as well as at a high pressure. In such instances, it is necessary to have a pressure containing window seal between the radar instrument and the interior of the tank, to protect the instrument from harsh, corrosive process materials. The window seal has to be able to transmit microwave energy for operation of the radar gauge.

Various manufacturers have advanced radar gauges, including the MICROPILOT radar gauge made and sold by Endress+Hauser. These devices are used for determining levels of various materials.

Window seals made of polytetrafluoroethylene (PTFE) are commonly used, but under high temperatures and high pressures they will tend to flow, so that the pressure carrying capability is reduced at such high temperatures. Usually the need for high pressure performance is when the temperature is high as well. Thus, being able to control the flowing of the PTFE at process temperatures is desirable for maximum utilization of the window materials.

SUMMARY OF THE INVENTION

The present invention relates to a process isolator seal and microwave energy transmitting assembly for determining the level of material in a container. The container has a top opening surrounded by a bounding surface. A microwave energy gauge or transmitter is mounted above the opening on a microwave transmissive window seal member which is of size to close the opening, and which has a flange supported on the bounding surface. An electromagnetic shielding material containment ring surrounds the microwave window seal member and encloses the edge surface of the microwave window seal member. The edge of the containment ring carries a resilient electromagnetic shielding O-ring that also seals on the bounding surface. The containment ring preferably controls the peripheral size of the microwave window seal member under clamping forces adjacent the periphery of the seal.

The container as shown is a process fluid tank on which a microwave radar level gauge or transmitter is mounted. As shown, a support flange of the window seal is clamped between the bounding surface on the tank flange on the customer's tank, and a stand off pipe that surrounds a horn antenna on the microwave level gauge or transmitter. The clamping of the microwave window seal member between flanges will retain it securely, and create a seal, but under high tank pressures, and high temperature and humidity, and with highly corrosive materials, the preferred PTFE material for the window seal member will tend to cold flow or to creep. Creep can occur even under lower temperatures when the pressures are high. The containment ring surrounding the window seal member controls the amount of creep or cold flow radially outwardly, thereby reducing the shear stress in the PTFE and increasing the pressure rating for a given temperature in a comparable size seal.

The containment ring helps to maintain the shape of the PTFE window seal member over time. The containment ring preferably has an inwardly extending lip that overlies a portion of the seal flange. Clamping forces are applied to the containment ring, and the lip provides a cross sectional area engaging the seal flange on which the applied clamping loads act that is less than the stand off pipe flange. Also, the load from pressure in the process fluid tank is applied over this smaller cross sectional area defined by the lip of the containment ring. Shear stress is reduced and the pressure rating is increased.

The containment ring is made of a material such as stainless steel, which provides the electromagnetic interference (EMI) shielding. Other gaps where microwave radiation can escape are closed by an O-ring that contains materials which will provide EMI shielding between the edge of the containment ring and the bounding surface. The O-ring also forms a pressure seal between the edge of the containment ring and the bounding surface of the tank flange.

The reduction in stray electromagnetic radiation emissions from the radar gauge or transmitter permits installation without obtaining a separate license from agencies such as the Federal Communications Commission.

A metal, spiral gasket is used above the lip of the containment ring and is clamped in place with the stand off ring to further increase the integrity of the seal.

A process fluid environmental seal O-ring also can be provided on the PTFE window seal. As shown the O-ring is mounted in a shouldered groove open at the periphery of the PTFE window seal flange. The containment ring closes the shouldered groove so the environmental seal O-ring is trapped in place.

DETAILED DESCRIPTION OF THE PREFERRED EMBODIMENTS

Figure 1:
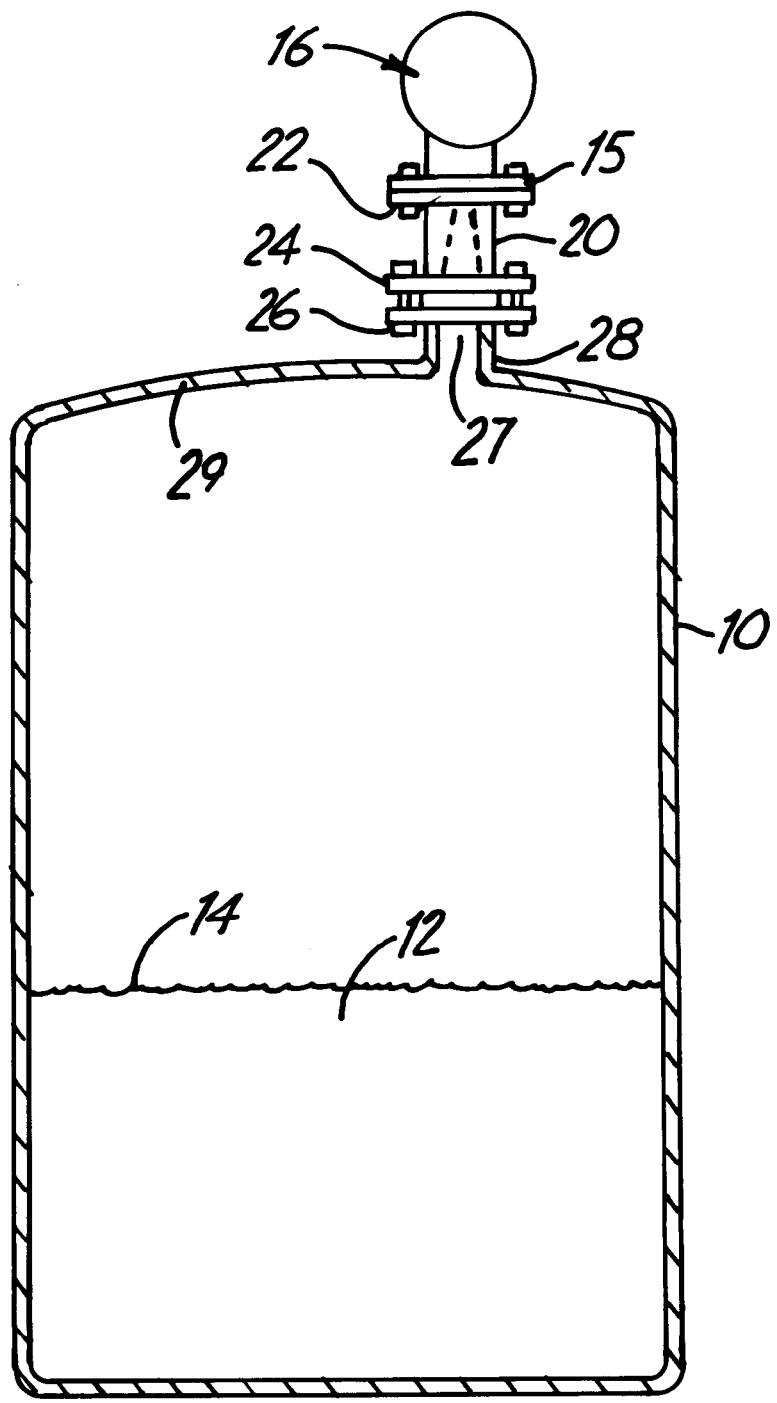
FIG. 1 is a schematic representation of a typical process material tank that has a radar level gauge or transmitter mounted thereon, utilizing a window seal assembly of the present invention.
Figure 2:
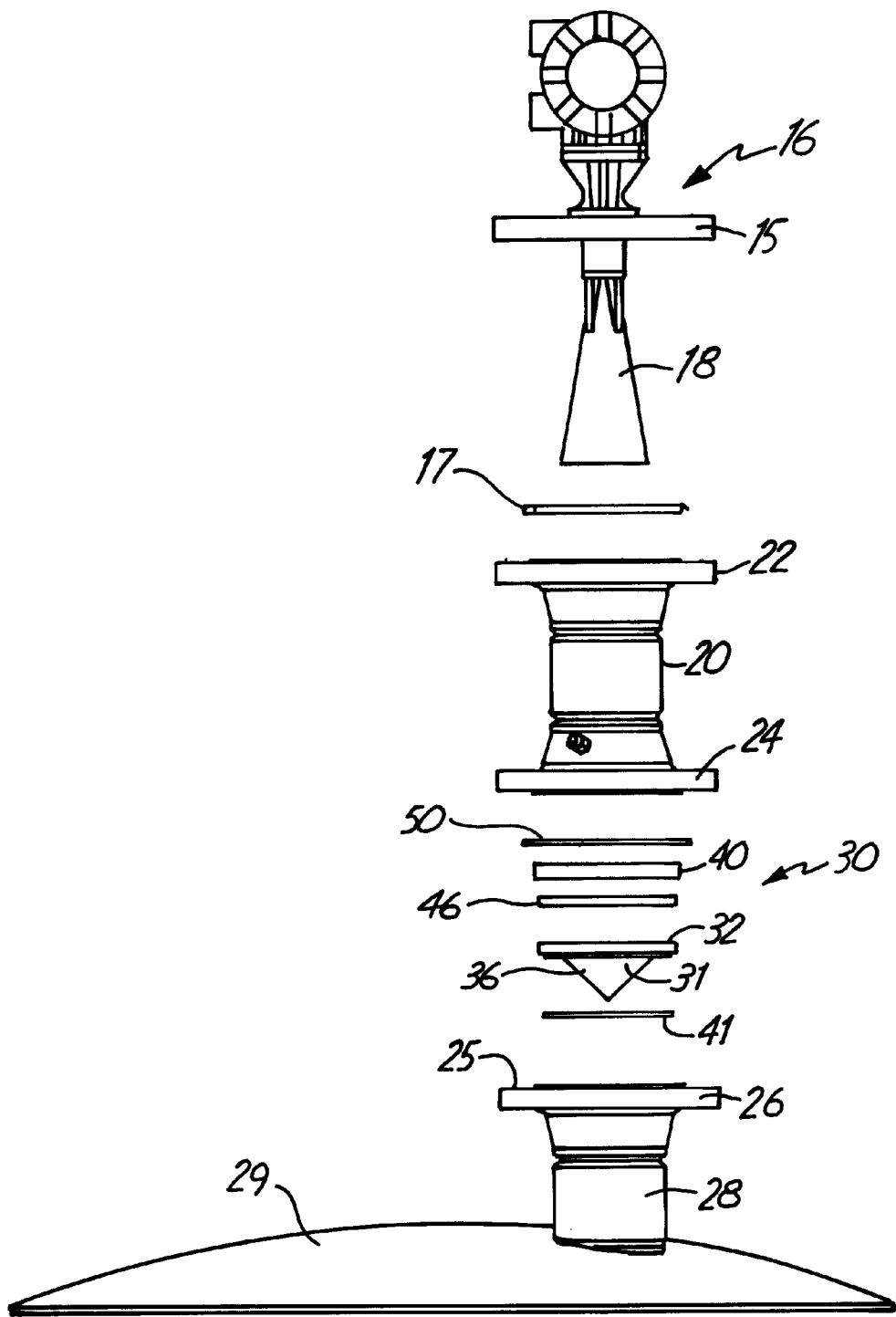
FIG. 2 is an exploded view of the window seal assembly of the present invention.

A process tank or container 10 as shown has a process liquid 12 therein with a surface 14, the height of which surface 10 is to be determined relative to the bottom of the tank. A radar gauge or transmitter 16 that transmits microwave energy through a horn antenna 18, is positioned at the top of the tank 10. The radar gauge or transmitter 16 is mounted on a cylindrical stand-off pipe or spool piece 20 that has a top flange 22 on which a flange 15 of the radar gauge or transmitter 16 is mounted. A spiral wound metal gasket 17 may be used between flanges 15 and 22 (FIG. 2). The stand off pipe 20 is cylindrical and surrounds the horn antenna 18 in the form shown.

The stand off pipe 20 has a bottom flange 24 that is of standard size bolt pattern and shape (ANSI or DIN standard) to mate with a bounding support surface 25 of a standard size mounting flange 26 on the top of a nozzle or neck 28 on the tank 10. All flanges have industry standard bolt circles. The nozzle or neck 28 is fixed to a top wall 29 of the tank and surrounds a port or opening 27 in the top wall. The port is bounded by the surface 25 of flange 26.

The tank 10 may be under high pressure, as well as relatively high temperature from time to time, and it is desirable to have a reliable isolation seal between the lower surface of the flange 24 of the stand off pipe 20 and the surface 25 of the mounting flange 26. Since the radar gauge or transmitter 16 transmits and receives microwave energy for determining the level of the surface 14, the isolation seal also has to be capable of transmitting microwave energy and thus it acts as a microwave radiation transmitting window. The process isolation window seal assembly also has to be pressure tight and fluid tight so that caustic materials, and sometimes even toxic materials that are contained within the tank 10, are isolated from and not permitted to contact the antenna 18 or the more delicate radar gauge 16.

The thickness of the rim of the window seal between the surfaces of the flange 24 and the flange 26 is of concern because electromagnetic radiation or microwave energy can be scattered, or leak, through the material. The PTFE window seal has to be thick enough to withstand the pressures inside the tank.

The tank or container 10 has the opening or port 27 on its upper side surrounded by the bounding surface 25. The microwave gauge or transmitter 16 is provided above the opening 27. An isolation microwave transmitting window seal assembly indicated generally at 30 comprises a window seal member 31 supported by an annular seal member mounting flange 32 on the bounding surface 25. The seal member flange 32 has a periphery larger than the internal diameter of the opening 27, the neck 28 and the stand-off pipe 20. The flange 32 has a periphery 42 that is of size to fit within the bolts shown at 34 (FIG. 3) that are arranged in a standard bolt circle for standard flanges and which pass through aligning openings in the flange 24 and the flange 26. The window seal member 31 including flange 32 thus is of size to overlie the port 27 on the container or tank and is supported on bounding surface 25.

In this form of the invention, the window seal member 31 is formed as an inverted cone indicated at 36 in its center section in the opening 27. The cone 36 covers and seals the opening 27 formed by the neck 28 and extends down into the passageway formed by the neck 28. The cone 36 provides a drip peak 38 at its lower end.

The seal member flange supports the microwave transmitter or gauge 16 through the stand-off 20 above the opening 27.

Figure 3:
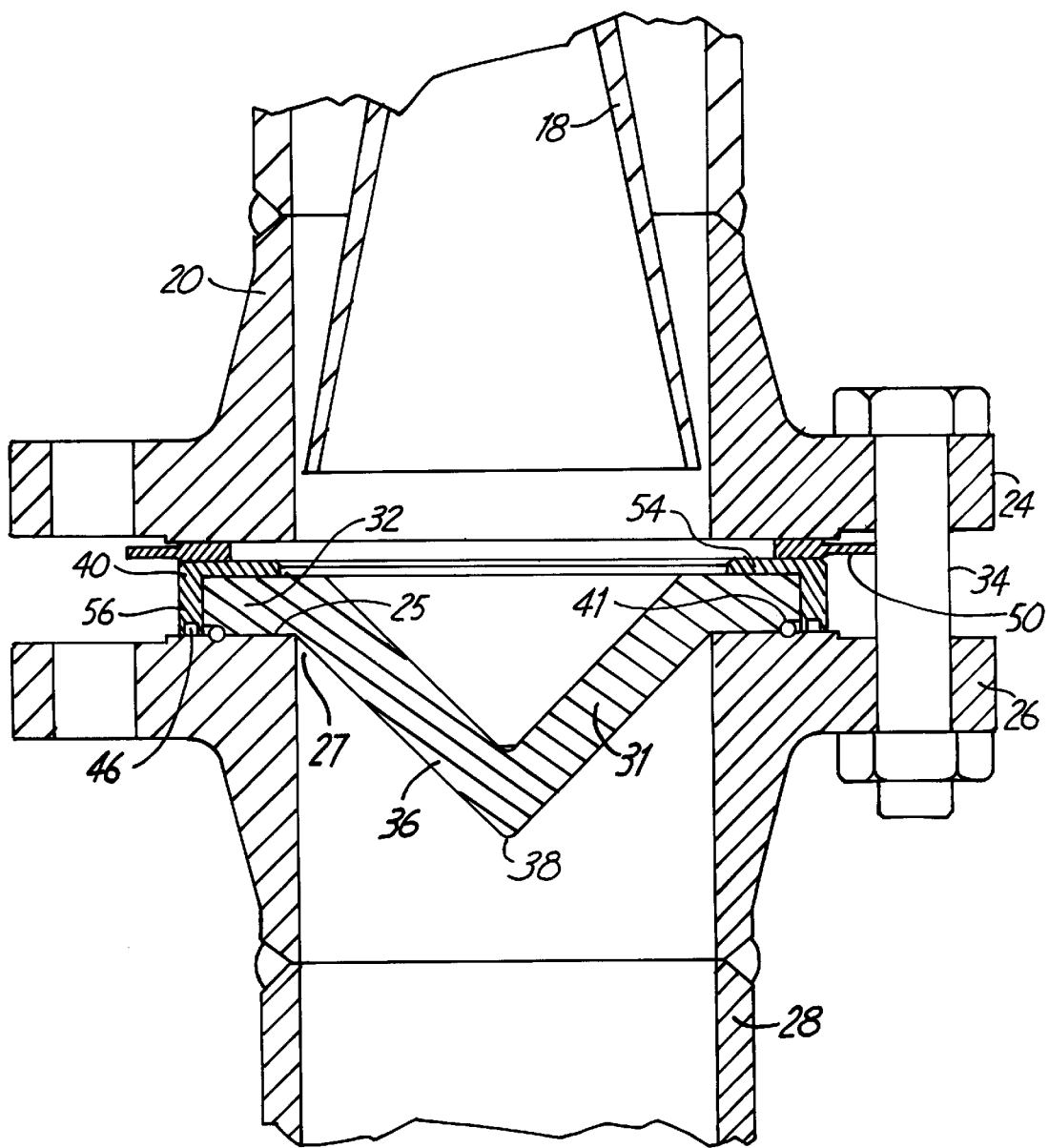
FIG. 3 is a sectional view of the radar gauge shown mounted onto a nozzle of the tank shown in FIG. 1 and incorporating the window seal assembly of the present invention.
Figure 4:
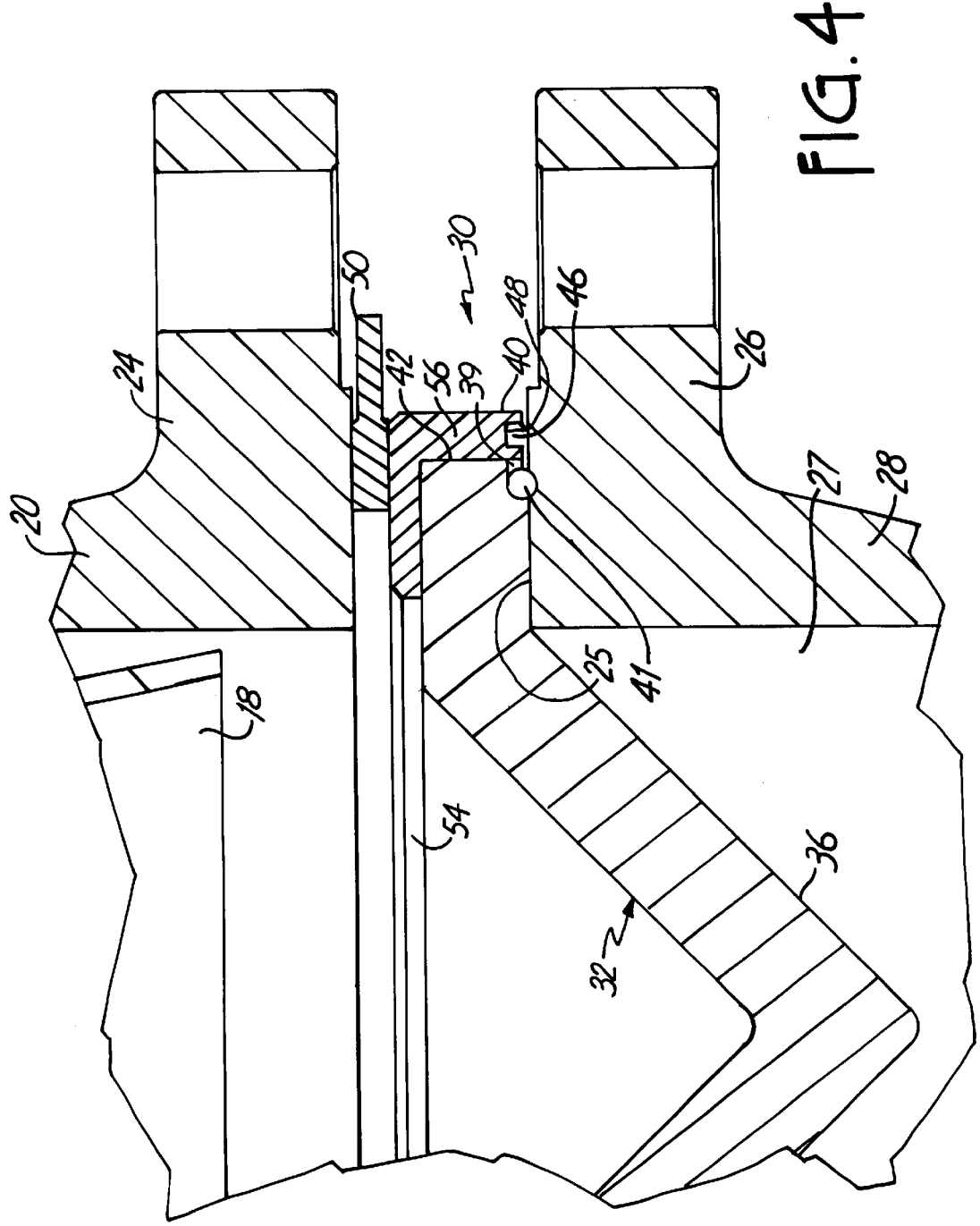
FIG. 4 is an enlarged fragmentary sectional view of one side of the installed window seal of the present invention shown installed between mounting flanges.

The components of the isolation window seal assembly 30 are shown in FIG. 2 in exploded view and in FIGS. 3, and 4 in cross section. An electromagnetic interference shielding material ring 40, slips over the peripheral edge surface 42 of the seal member rim or flange 32 with a very close fit. The fit preferably is in the range of 0.015 inches, total clearance. The ring 40 has an outer peripheral wall 56 with an edge surface that has a groove 48 for holding a resilient O-ring 46 made of electromagnetic interference (EMI) shielding material to contain stray electromagnetic radiation. The O-ring 46 seals on the bounding surface 25. The EMI shielding O-ring 46 is made of a compressible material impregnated with metal flakes and is available from commercial sources such as Chomerics Division of Parker Hannifin PLC, Woburn, Mass., USA.

The ring 40 is a containment ring and is used for controlling the maximum expansion of the periphery 42 of the seal member flange 32 radially outwardly from a center axis. The window seal member periphery 42 is retained within the confines of a peripheral wall 56 of the containment ring 40 to overcome tendencies of the rim or flange 32 to cold flow or to creep under clamping pressures or loading pressures. The containment ring 40 may be made of stainless steel or other suitable materials that provide electromagnetic interference shielding and the containment function.

The isolation window seal rim or flange 32 has a shoulder groove 39 formed in its lower surface that is open to the periphery of the rim or flange 32. A process environmental seal O-ring 41, made of suitable elastomeric material, that is chemically compatible with the tank contents so it will withstand the environment, is mounted in groove 39. An elastomer sold under the trademark VITON has been found satisfactory for O-ring 41. Parker Seal Group, O-Ring Division, of Lexington, Ky., USA makes suitable O-rings.

The containment ring 40 includes an annular lip portion 54 overlying the seal member flange 32 adjacent the periphery of the seal member flange. Ring 40 is a continuous ring machined, as stated, to close diametral tolerances and also is of close tolerance in axial length (height) from the bottom surface of the annular lip 54 to the lower edge of the outer peripheral wall 56.

The annular lip 54 of containment ring 40 is integral with and at right angles to the outer peripheral wall 56 of the containment ring 40. The lip 54 is also annular and surrounds a center opening that leaves the window seal member 31 unobstructed in regions above the opening 27.

The clamping from the flange bolts 34 will provide compression load through lip 54 on the isolation window seal flange 30, and will load the environmental seal O-ring 41 when the ring 40 is clamped toward the bounding surface 25. The O-ring groove 39 in the seal member opens to the periphery of the seal member flange 32, and the peripheral wall 56 of the containment ring forms an annular outer side surface for the O-ring groove 39. The cross section are of the lip 54 is smaller than the flanges 24, and is selected to provide the appropriate loading on the flange 32 of the window seal.

A conventional spiral wound metal gasket 50 is placed on top of the upper surface of the lip 54, and is compressed against the lip 54 when the flange 24 is clamped toward flange 26 with bolts 34. The spiral wound gasket 50 provides a compression seal between the upper surface of the lip 54 and the bottom surface of flange 24 of the spool piece or stand-off 20. The spiral gasket is available from Lamons Gasket, Houston, Tex., USA.

It should be understood that with different antennas, the stand-off pipe 20 can be varied in configuration, and if no antenna is necessary or if there is a need for having an antenna protruding partially into the customer's tank nozzle, the PTFE isolation window seal 30 can be formed to surround the antenna, and the flange of the level gauge or transmitter housing can be clamped against the lip 54.

As shown perhaps best in FIGS. 3 and 4, the seal member rim or flange 32 is resting on bounding surface 25 of flange 26 of the neck 28, and the window seal member 31 extends across the port or opening 27 formed by the neck and leading to the container or tank 10. FIGS. 4 and 5 are enlarged views which show the groove 48, and the EMI shielding O-ring 46 that seats down onto the bounding surface 25 of the flange 26 of the tank nozzle as the lip 54 of the containment ring 40 clamps onto flange 32 and the edge of the ring 40 moves toward the surface 25. The EMI shielding O-ring 46 is carried by the containment ring 40 to seal on such bounding surface 25 as clamping forces are applied to the containment ring.

The groove 39 in the seal member flange 32 is shown in FIG. 4 as well, and it can be seen that the process environmental seal O-ring 41 is contained by the inner surface of the annular band 56 of the containment ring 40 and the surface of shoulder groove 39 in the edge of seal member flange 32.

The bolts 34 that are used for clamping the flanges 24 and 26 together are tightened to the desired torque, and the annular lip 54 of the containment ring 40 will provide load against the outer portions of the seal member flange 32 of window seal member 31. This insures adequate seal pressure on the seal member flange 32 across a wide range of internal tank pressures and temperatures, and also causes compression of O-ring 41

The seal member flange 32 is slightly thicker than the height 44 of the lip so as the bolts 34 are tightened there is a desired clamping force to compress the seal member flange 32, the environmental O-ring 41 and EMI shielding O-ring 46 for sealing and for electromagnetic radiation shielding. Very high internal tank or container pressures can be withstood without failure. Also, pressure leakage over time is very low because of the containment ring and the seals.

Another aspect of the invention comprises a method of sealing the opening 27 bounded by surface 25 using window seal member 31 to overlie the opening 27. The seal member 31 has a periphery 42 defining a seal member flange portion 32 overlying the bounding surface 25. The method comprises the step of encircling the periphery of the window seal member 31 with a containment ring 40 made of electromagnetic interference (EMI) shielding material and placing a compressible EMI shielding material between the edge of the ring 40 and the bounding surfaces. The method includes one aspect forming the ring 40 of size to control the maximum peripheral size of the seal member 31 under clamping forces adjacent the periphery of the seal member from bolts 34 and under pressures acting on the seal member 31 through further forming a pressure seal between the bounding surface 25 and the seal member 31 with an environmental O-ring 41, which is held in a groove 39 with the containment ring 40 is part of the method.

While a conical shape isolation window seal member has been shown, the containment ring 40 functions well with other configurations of isolation window seal members as well, because the containment ring will prevent the expansion of the peripheral dimensions of the periphery 42 of the isolation window seal member if the isolation window seal member creeps or cold flows. Thus, lenticular seals, planar or plate seals, and other geometric configurations will benefit from the containment ring shown.

The window seal arrangement permits removal of the radar gauge or transmitter and horn antenna without disturbing the isolation window seal, so the tank contents will not be exposed to atmosphere. This permits maintenance or replacement of the radar gauge without breaking the tank seal.

Although the present invention has been described with reference to preferred embodiments, workers skilled in the art will recognize that changes may be made in form and detail without departing from the spirit and scope of the invention.

What is claimed is:

1. A process isolation window seal and microwave energy transmitting assembly used for determining the level of a material in a container having an opening in an upper side, the opening being surrounded by a bounding surface, the seal and assembly comprising:

a microwave transmissive seal member of size to close the opening of the container and having a seal member flange of size to be supported on the bounding surface of the container, microwave energy being transmitted through the seal member;

an electromagnetic interference (EMI) shielding material first ring surrounding a periphery of the seal member flange and having a height substantially to enclose an edge surface of the seal member flange, an edge surface of said first ring positioned to face the bounding surface of the opening of the container and having a groove formed therein surrounding the seal member flange; and a resilient second ring of material that provides electromagnetic interference shielding mounted in said groove for sealing on the bounding surface.

2. The assembly of claim 1, wherein said first ring comprises a containment ring and is sized to surround the seal member flange with a clearance to control the expansion of the seal member flange radially outward from a center axis.

3. The assembly of claim 2, wherein said containment ring includes a lip portion overlying the seal member flange adjacent peripheral edges of the seal member flange, said lip portion being compressed against said seal member flange when the seal member flange and containment ring are clamped toward the bounding surface.

4. The assembly of claim 1, wherein the periphery of said seal member flange is substantially circular, and said first ring has a mating interior surface.

5. The assembly of claim 1, wherein the height of said first ring from the first ring edge surface engaging the seal member flange is less than the height of the seal member flange.

6. The assembly of claim 5, wherein said first ring is made of a stainless steel.

7. The assembly of claim 6, wherein said seal member is made of polytetrafluoroethylene.

8. The assembly of claim 1 wherein an O-ring groove is formed at an outer edge of the seal member flange and is enclosed on one side by an interior surface of the first ring.

9. A process isolation window seal assembly for transmitting energy therethrough in association with a material in a container, wherein there is an opening to the container, and the opening is bounded by a bounding surface, the assembly comprising:

a seal member of size to overlie the opening on the container and to be supported on the bounding surface, the seal member having a periphery;

a containment ring surrounding the seal member to control the peripheral size of the seal member under clamping forces adjacent the periphery of the seal member; and wherein said containment ring has a surface to overlie on the bounding surface of the container opening, and an EMI shielding O-ring seal is carried by the containment ring to seal the bounding surface as clamping forces are applied to the containment ring.

10. The process window seal of claim 9, wherein the containment ring comprises an electromagnetic interference shielding material.

11. The process window seal of claim 9 and an O-ring groove formed in the seal member adjacent a periphery of the seal member and being open in an outwardly facing direction, said containment ring forming an annular outer side surface of the O-ring groove.

12. The process window seal of claim 11 and a separate O-ring mounted in the containment ring to engage the bounding surface, the separate O-ring comprising a material providing electromagnetic interference shielding.

13. The process window seal of claim 9 and a stand-off pipe comprising a tubular member having a first flange clampable with respect to a container for applying the clamping forces to the containment ring and seal member, a microwave transmitter level gauge mountable on the stand-off pipe at an opposite end from the first flange, and a microwave antenna extendable into and surrounded by the stand-off pipe, the seal member comprising a microwave transmitting material.

14. The process window seal of claim 9, wherein said containment ring includes a peripheral wall portion surrounding the seal member, and a clamping lip portion overlying a portion of the seal member that is to be supported on the bounding surface, the lip portion carrying clamping force to the seal member when the seal member is supported on the bounding surface.

15. The process window seal of claim 14, wherein the peripheral wall portion of said containment ring has a lower edge, an O-ring groove formed in the lower edge, and a compressible ring mounted in said O-ring groove, said compressible ring comprising a material providing electromagnetic interference shielding.

16. The process window seal of claim 15, wherein said seal member has a conical exterior surface.

17. A method of sealing an opening bounded by a surface using a seal member overlying the opening, the seal member having a periphery defining a portion overlying the bounding surface, comprising the steps of encircling the periphery of the seal member with a containment ring made of electromagnetic interference shielding material, the ring having an edge surface facing the bounding surface, and providing compressible resilient material that provides electromagnetic shielding between the edge surface and the bounding surface to control a maximum peripheral size of the seal member under clamping forces adjacent the periphery of the seal member and under pressures acting on the seal through the opening.

18. The method of claim 17, including the step of forming the containment ring to surround the seal member with clearance.

19. The method of claim 17, including the step of forming the seal member of polytetrafluoroethylene and forming central portions of the seal member into a conical shape.

20. The method of claim 18 including the step of providing a pressure seal between the bounding surface and the seal member, and containing the pressure seal with the containment ring.

21. The method of claim 19 including the step of clamping the portions of the seal member overlying the bounding surface of the opening with a lip on the containment ring.

22. A process seal adapted for transmitting energy therethrough in association with material in a container, a port open to the container, the opening being bounded by a sealing surface, the seal comprising:

seal means for sealing the opening and having a peripheral flange means for being supported and sealing on the sealing surface, the seal means having a periphery;

containment ring means for controlling the peripheral size of the seal means under tendencies of the seal means to change maximum peripheral dimension; and a resilient ring means for shielding electromagnetic interference and sealing between the containment ring means and the sealing surface.

23. The process seal of claim 22 and further comprising groove means for opening outwardly in a radial direction and being bounded by the containment ring means, and O-ring means for providing a seal on the sealing surface.

24. The process seal of claim 22, wherein said containment ring means has ring lip means for extending inwardly to overlie a portion of the peripheral flange means and for providing clamping forces at a defined region of the peripheral flange means when the containment ring means is clamped toward the sealing surface.

25. The process seal of claim 24, wherein the seal is sized for use with a standard process pipe flange having a standard bolt circle.

* * * * *